March 2, 1965 G. A. FISHER 3,172,114

MAGNETIC RECORDING DEVICE

Filed Dec. 21, 1960 2 Sheets-Sheet 1

INVENTOR.
GENE A. FISHER
BY Robert B. Crouch
ATTORNEY

March 2, 1965 G. A. FISHER 3,172,114

MAGNETIC RECORDING DEVICE

Filed Dec. 21, 1960 2 Sheets-Sheet 2

United States Patent Office 3,172,114
Patented Mar. 2, 1965

3,172,114
MAGNETIC RECORDING DEVICE
Gene A. Fisher, Morgan Hill, Calif., assignor to International Business Machines Corporation, New York, N.Y., a corporation of New York
Filed Dec. 21, 1960, Ser. No. 77,367
10 Claims. (Cl. 346—74)

The present invention relates to a magnetic recording device and, more particularly, to a device for high density recording on relatively short strips of thin flexible material.

Magnetic recording on thin flexible strips, such as plastic tape, is attractive as a means of storing data for record purposes. A large amount of data can be recorded on a single strip, the information can be easily replaced, erased, or brought up to date, and the strips are easily and economically stored in a minimum amount of space. However, conventional magnetic recording devices do not permit maximum utilization of the capabilities of plastic tape for high density recording. The commercially available tape recorders generally employ circular loops or reels of tape as the recording medium. The loops present storage problems since they cannot be creased or folded. Accordingly, considerable space is necessary to store any appreciable number of loops so that they are readily accessible. The reels of tape make it difficult to process any given piece of information which may be recorded thereon because the entire reel (in excess of 100 feet of tape) must be scanned to find the information. Accordingly, reels do not readily lend themselves to random access of the recorded information.

Devices have been suggested in the past for high density magnetic recording of signals on relatively short strips of plastic tape. These devices have usually involved attachment of the strips to the periphery of a processing drum and then rotation of the drum past a fixed magnetic transducer. In these devices, it has been very difficult to obtain a completely uniform spacing between the transducer and the magnetic surface of the strip. This difficulty arises because of the expense and exacting work involved in machining a completely smooth and accurately cylindrical drum surface and then mounting the drum for rotation past a fixed magnetic transducer. To avoid this problem, it has been proposed to use a resilient surface on the drum to urge the strip into contact with the transducer. The contact between the transducer and the strip produces good resolution and readability of the recorded signals, but the friction between the moving strip and the transducer results in a relatively short usable life for the strip.

The object of the present invention is to provide an inexpensive magnetic recorder capable of non-contact recording on relatively short strips of thin, flexible material while producing good resolution and readability of the recorded signal.

The above object is realized in the present invention by provision of a housing having a relatively smooth cylindrical inner surface with one or more magnetic transducers mounted in the housing. Means, including a shaft and one or more radially extending arms, is provided for rotating a strip of thin, flexible magnetic recording medium in close proximity to the cylindrical surface. In this invention the recording medium is spaced from the cylindrical surface and the transducers by a thin film of air of uniform thickness over the entire length and width of the strip.

Other objects and many of the attendant advantages of this invention will be readily appreciated as the same becomes better understood by reference to the following detailed description when considering connection with accompanying drawings wherein.

Figure 1:
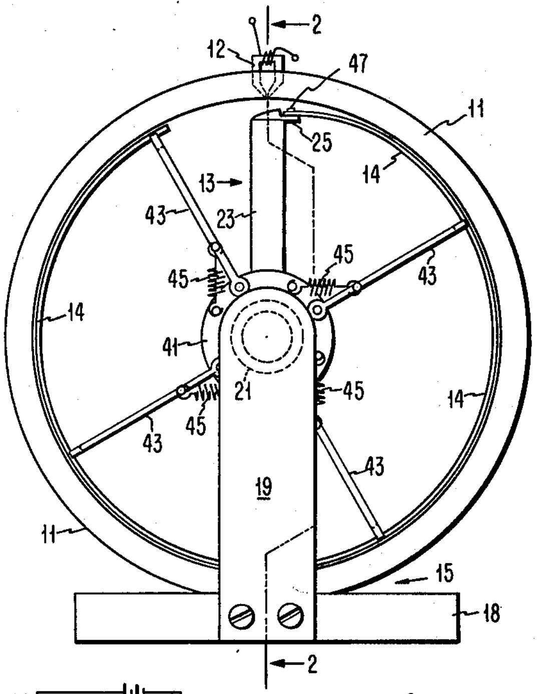
FIG. 1 is an end view of a preferred embodiment of the recording device of the present invention.

As shown in FIG. 1, the essential features of the present invention are a housing 11 having a cylindrical inner surface, at least one magnetic transducer 12 mounted in the housing, a carriage 13 for rotating a magnetic recording film 14 within the housing, and a base 15 for supporting the housing and carriage.

Figure 2:
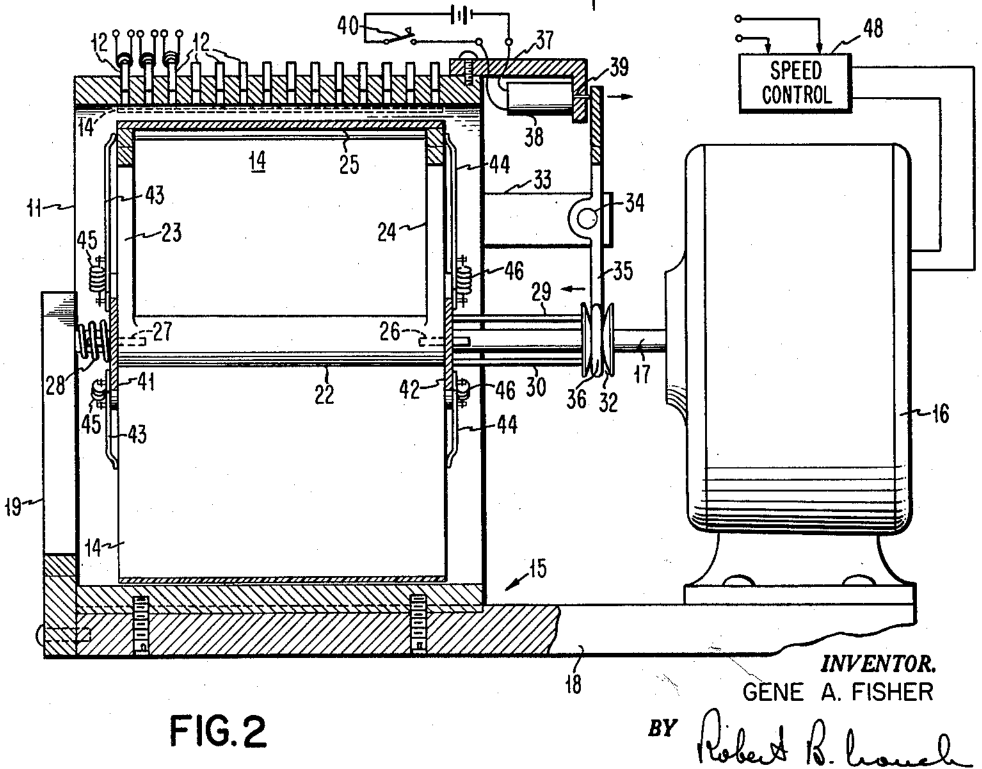
FIG. 2 is an elevation view taken in section along lines 2—2 of FIG. 1.
Figure 3:
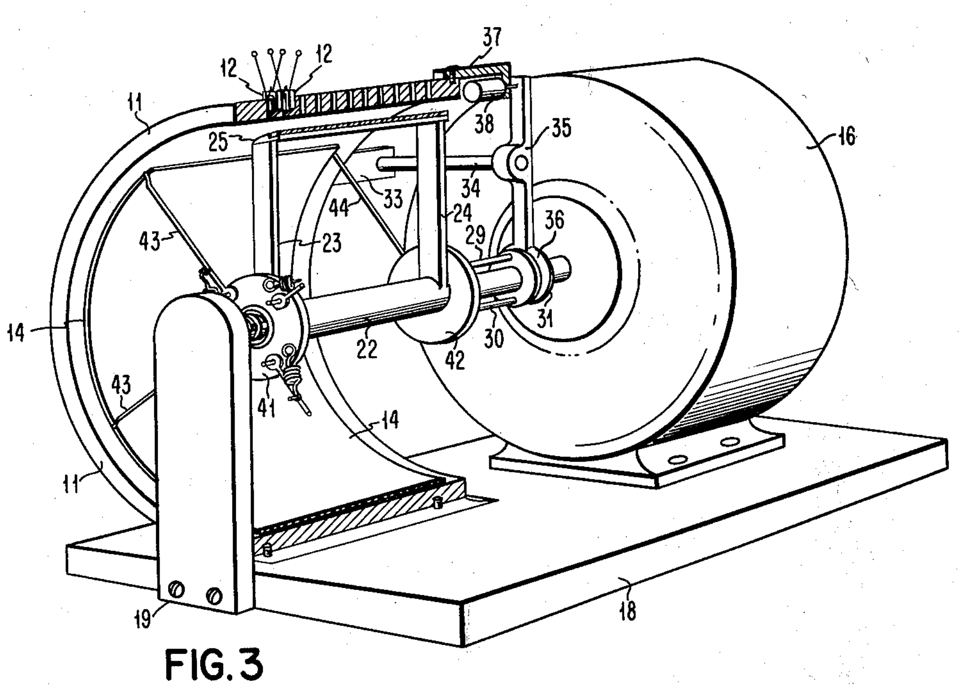
FIG. 3 is a perspective view of a device of FIGS. 1 and 2 with parts broken away.
Figure 4:
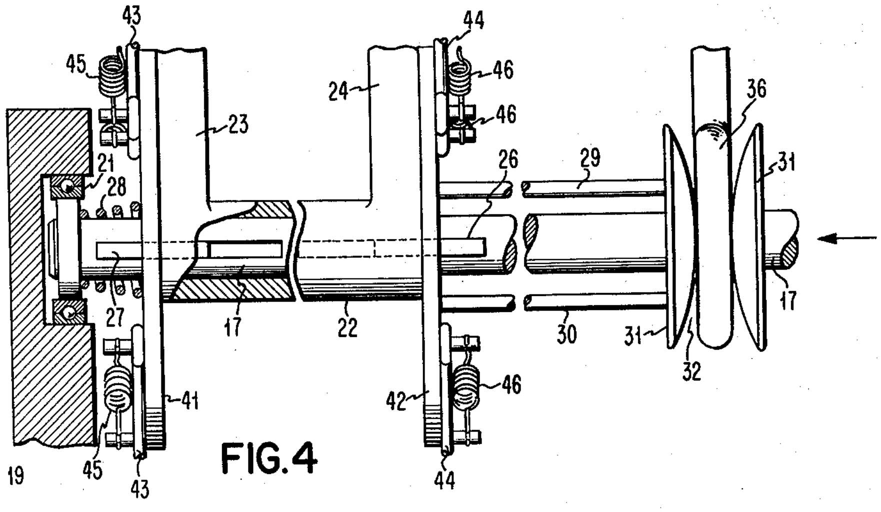
FIG. 4 is a detailed view partly in section of the carriage shifting mechanism of FIG. 2.

Referring to FIG. 2, an electric motor 16 is positioned adjacent the housing 11 and is drivingly connected to the carriage 13 by means of a shaft 17. The motor and the housing are secured to a base plate 18 which holds them in fixed relation. A bracket 19, which forms a part of the base, extends vertically from the base plate 18 and supports the distal end of shaft 17 for rotation, such as by a ball bearing 21 illustrated in FIG. 4.

The carriage 13 includes an elongated tubular sleeve 22 mounted in concentric relation with the shaft 17. Radially extending arms 23 and 24 protrude from opposite ends of the sleeve. A head bar 25 is secured to the extremities of the arms 23 and 24 in closely spaced relation with the internal surface of the housing. The carriage is secured to the shaft as by splines 26 and 27, to permit limited relative axial movement therebetween. A compression spring 28 surrounds the shaft adjacent bearing 21 and biases the carriage away from bracket 19. Rods 29 and 30 protrude from the sleeve at the end removed from spring 28. A cross head 31 having a circumferential groove 32 is carried by the rods 29 and 30 in spaced relation with the end of the sleeve. A bracket 33 is secured to the housing and protrudes therefrom toward the motor. A shaft 34 is carried by bracket 33 and provides a pivotal support for lever 35. Lever 35 is provided with a bifurcation 36 at one end which is received within groove 32 in the cross head 31. A bracket 37 is mounted on the housing and supports an electric solenoid 38, the armature 39 of which is in alignment with the end of lever 35 removed from the bifurcation 36. The solenoid 38 is connected to a source of electrical potential through a switch 40.

The opposite ends of sleeve 22 are provided with circular collars 41, 42. A series of elongated wires 43, 44 are pivotally connected at one end to the collars. Tension springs 45 and 46 are connected between the collar and each wire.

In the operation of the present invention, a flexible strip of magnetic recording film 14 is secured along its leading edge to the headbar 25, as by studs 47 received in slots in the strip, or by any other suitable means. Motor 16 is then actuated through a speed control 48 to rotate shaft 17 and carriage 13. Rotational movement of the carriage pulls the recording film in a circular path within the housing. The unsupported length of the film is moved into close proximity with the inner surface of the housing by the effect of centrifugal force. However, the film does not contact the housing since it rides on an air bearing formed by the *boundary layer* air carried by the rotating film. This air bearing is self-acting and is of uniform thickness over the entire length and width of the film and is of essentially constant thickness over a wide range of rotational speeds. The spacing between the film and the interior surface of the housing, as determined by the thickness of the air bearing, is approximately 150 microinches over the entire circumference of the film. Short strips of film, up to approximately 8–10 inches in length, will track in a straight line, so that no provision need be made for positioning the unsupported length of the film within the housing. For longer strips, from 12 to approximately 36 inches in length, provision should be made for axial positioning of the strip during rotation. It is for this purpose that collars 41, 42, wires 43, 44 and springs 45, 46 are provided. When the carriage is not rotating, springs 45, 46 bias wires 43, 44 to a position generally tangential to the sleeve. In this position, the free ends of the wires are spaced inwardly of the head bar and permit ready access to the head bar for the insertion or removal of the film strip. When the carriage is rotated, the wires are moved to a radial position under the influence of centrifugal force. In such position, the free ends of the wires overlap the edges of the film strip to position it axially within the housing and guide the unsupported length during rotation.

In effect, when rotated, the film strip employed in the present invention forms a flexible drum upon which information can be recorded in parallel circular tracks. Since the transducers 12 are mounted in the housing, a means is provided which will permit scanning of a plurality of tracks by each head. This is accomplished by shifting the carriage, and the attached film strip, axially of the housing a distance equal to the spacing between tracks. Actuation of solenoid 38 by closure of switch 40 will extend armature 39 to pivot lever 35 and move cross head 31 with the attached carriage to the left in FIG. 2 against the action of spring 28. When switch 40 is opened the solenoid is inactivated and spring 28 restores the carriage to its original position.

Since the spacing between the film strip and the internal surface of the housing remains essentially constant, the recording gap (the space between the pole tips of the transducer and the recording surface of the film) can be reduced to a minimum by extending the pole tips of the transducers inwardly of the internal surface of the housing. This can be facilitated by molding the transducers into the housing or by mounting the transducers for adjustment radially of the housing. If it is desired to mount the transducers in the housing with their pole tips flush with the internal surface thereof, the spacing between the film strip and the internal surface of the housing can be reduced to some extent. The pressure of the rotating air within the interior of the flexible drum formed by the tape helps maintain the tape in position. Accordingly, the position of the tape can be shifted closer to the internal surface of the housing by increasing the pressure of the rotating air within the interior of the tape. The pressure of the central air can be increased by the use of fins or impellers on sleeve 22 to pump additional air into the interior of the drum formed by the tape. Since the air bearing between the strip and the inner surface of the housing is self-acting, no external source of pressure, such as compressed air, is required to maintain it.

While wires 43, 44 are shown at either end of the carriage, the wires 44 adjacent the motor 16 can be fixed in their radial position if desired. In this respect, care should be taken in assembling the wires to the collars to ensure that the wires do not impose any compressive force on the tape which might tend to buckle it.

The strips of tape used as the recording medium in the present invention can be stored flat and indexed for ready access. Since the strip does not contact either the magnetic transducer or the inner surface of the housing, the effective life of the strip is almost unlimited. The strips are readily accessible for manual insertion and removal since the absence of a processing drum allows the strip to be quickly attached to or detached from the head bar.

Obviously, many modifications and variations of the present invention are possible in light of the above teachings. It is therefore to be understood that within the scope of the appended claims the invention may be practiced otherwise unless specifically described.

What I claim is:

1. Magnetic recording apparatus for non-contact recording comprising: a housing having an internal cylindrical surface; at least one magnetic transducer mounted in the housing and having pole pieces open to the interior thereof; and a carriage for rotating a strip of flexible recording material in close proximity to the cylindrical surface and the pole pieces while maintaining a thin self-acting air bearing of uniform thickness between the surface and the full periphery of the strip, the carriage including means for grasping the leading edge of the strip while the remainder of the strip is unsupported.

2. Magnetic recording apparatus for non-contact recording as defined in claim 1 in which the carriage includes means for guiding the strip in a circular path.

3. Magnetic recording apparatus for non-contact recording as defined in claim 2 in which the means for guiding the strip is retractable when the carriage is at rest and automatically extensible during rotation thereof.

4. Magnetic recording apparatus for non-contact recording as defined in claim 1 in which the carriage includes a shaft journaled for rotation within the housing, at least one arm carried by the shaft and extending radially toward the cylindrical surface of the housing with the means for holding the leading edge of the strip mounted on the distal end thereof, and means for guiding the strip in a circular path past the transducer.

5. Magnetic recording apparatus for non-contact recording as defined in claim 1 including means mounted on the housing for shifting the carriage axially of the housing.

6. Magnetic recording apparatus comprising: a housing having an internal cylindrical surface; at least one magnetic transducer mounted in the housing and having pole pieces exposed to the interior thereof; and a carriage for rotating a strip of flexible recording material in close proximity to the cylindrical surface and the pole pieces, the carriage including a shaft journaled for rotation within the housing, a sleeve mounted concentrically on the shaft, a pair of arms extending from opposite ends of the sleeve radially toward the cylindrical surface, means carried by opposite ends of the sleeve for guiding the strip in a circular path, and means on the distal ends of the arms for holding the leading edge of the strip.

7. Magnetic recording apparatus as defined in claim 6 in which the last named means includes a head bar connected to the distal ends of the arms, and strip-engaging means on the head bar.

8. Magnetic recording apparatus as defined in claim 6 in which the means for guiding the strip is retractable when the carriage is at rest and extensible during rotation thereof.

9. Magnetic recording apparatus as defined in claim 6 in which the means for guiding the strip includes a collar secured to each end of the sleeve, a plurality of wires pivotally secured to each collar, and a spring connected to each wire biasing it tangentially of its associated collar.

10. Magnetic recording apparatus as defined in claim 6 which includes means mounted on the housing for shifting the carriage axially of the housing.

References Cited in the file of this patent

UNITED STATES PATENTS

| | | |
|---|---|---|
| 2,787,750 | Jones | Apr. 2, 1957 |
| 2,921,991 | Sher | Jan. 16, 1960 |
| 3,001,850 | Marrs | Sept. 26, 1961 |
| 3,029,416 | Quade | Apr. 10, 1962 |
| 3,036,304 | Willard | May 22, 1962 |